United States Patent
Jayakumar et al.

(10) Patent No.: US 11,847,366 B2
(45) Date of Patent: Dec. 19, 2023

(54) RESERVING A TRAY FOR A USER FOR SPECIAL MEDIA PRINTING

(71) Applicant: XEROX CORPORATION, Norwalk, CT (US)

(72) Inventors: Purushothaman Jayakumar, Chennai (IN); Ponnovian Parthasarathy, Chennai (IN); Duraimurugan Krishnasamy, Chengalpattu District (IN); Nisha Mohan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 62 days.

(21) Appl. No.: 17/346,667

(22) Filed: Jun. 14, 2021

(65) Prior Publication Data

US 2022/0398052 A1 Dec. 15, 2022

(51) Int. Cl.
*G06F 3/12* (2006.01)
*H04N 1/00* (2006.01)
*H04N 1/44* (2006.01)

(52) U.S. Cl.
CPC ....... *G06F 3/1238* (2013.01); *H04N 1/00694* (2013.01); *H04N 1/4406* (2013.01)

(58) Field of Classification Search
None
See application file for complete search history.

(56) References Cited

U.S. PATENT DOCUMENTS

| | | | |
|---|---|---|---|
| 8,009,302 B2 | 8/2011 | Martin | |
| 8,823,987 B2 | 9/2014 | Sponable et al. | |
| 9,798,962 B2 | 10/2017 | Iida | |
| 2006/0282590 A1* | 12/2006 | Yoshimura | G06F 3/1238 710/260 |
| 2007/0061474 A1* | 3/2007 | Quach | H04N 1/00875 709/229 |
| 2007/0266237 A1* | 11/2007 | Kuroki | G06Q 30/04 713/156 |
| 2009/0303522 A1* | 12/2009 | Konsella | G06F 3/1222 358/1.15 |
| 2015/0183242 A1* | 7/2015 | Shirane | B41J 13/0009 347/16 |
| 2018/0034986 A1* | 2/2018 | Ishida | H04N 1/00525 |
| 2023/0035820 A1* | 2/2023 | Kimata | G06F 3/1204 |

* cited by examiner

*Primary Examiner* — Eric A. Rust
(74) *Attorney, Agent, or Firm* — JONES ROBB, PLLC; Susanne Jones

(57) ABSTRACT

The disclosure discloses methods and systems for reserving a tray for a user for special media printing. The method includes receiving one or more special media sheets as loaded by the user in the tray. Based on the loaded special media sheets, a tray ID of the tray is automatically identified. A user interface is provided to the user to input loaded media details such as media size, type, and color. Then, it is checked with the user whether to reserve the identified tray for the user for special media printing. Based on the check, a user interface is further provided to the user to input a user ID. Finally, the identified tray is automatically reserved for the user using the user ID and the tray ID, for printing a document later received from the user on the one or more special media sheets as loaded in the identified/reserved tray.

18 Claims, 11 Drawing Sheets

RESERVING A TRAY FOR A USER FOR SPECIAL MEDIA PRINTING

TECHNICAL FIELD

The present disclosure relates to the field of printing. More specifically, the disclosure relates to methods and systems for reserving a tray for a user for special media printing.

BACKGROUND

Typically, multi-function devices use regular media sheets (such as Plain media type) for printing various documents received from multiple users in an organization. But there are requirements when one or more users need special media printing. For example, a user requires to print a document or content on a special media such as a letterhead. In second example, another user requires to print a document on glossy papers. These are just two examples, but special media printing may be needed for various other reasons such as a job offer letter for a new employee is to be printed on a letterhead, or legal content needs to be printed on legal bond and so on.

For special media printing scenarios, a user first loads the desired special media in a tray of a multi-function device and submits a document for printing from his device for printing on the loaded special media, say, letterhead. This way, the user typically prints his document on the desired special media. However, there are scenarios where before the user (say user A) submits the document for printing to the multi-function device, some other user (user B) may select the same media type/tray and submits a document for printing. In such cases, the document received from another user (user B) gets printed on the special media as the user B is not even aware of the media loaded by the user (user A) for printing his document on the letterhead.

In detail, a user such as user A wishes to print a document on a special media, say legal bond. Here, the user A loads the legal bonds in a tray, say tray 2 of the multi-function device. Before the user A submits the document for printing to the multi-function device, another user such as user B selects the same tray i.e., tray 2 or media type legal bond while submitting his document for printing. Here, the multi-function device processes the document of the user B and prints his document on the legal bond paper. Here, the multi-function device simply processes the document based on a job queue and selection of print attributes by the user B as the device is not aware of who loaded the legal bond papers in the tray 2. Similarly, the user B is not aware of any special media in tray 2 loaded by user A for printing his documents.

In another scenario, a tray, say tray 2 of the multi-function device is loaded with a special media, say letterhead. But the user A wishes to print his document on another special media, say transparent papers. Here, the user A loads the transparent papers in the tray 2 to print his document. Before the user A submits his document for printing with the selection of tray 2, another user B wants to print his document on the letterhead and selects the tray 2 considering that the tray 2 includes the letterhead. The multi-function device again prints the document received from the user B and the user B document gets printed on the transparent papers which are originally loaded by the user A for printing his document.

In third scenario, the user A requires to print important content in special media, say letterhead and another user B is required to print his content in another letterhead. Despite both the user A and user B set the media type in different trays, there are chances that both the letterheads may get swapped. Here, the user A content gets printed in user's B letterhead and the user B content gets printed in user's A letterhead.

In all such scenarios, the user A requires to print his document again. Such situations may frustrate the user A and may increase the confusion between the user A and user B. This may additionally result into wastage of resources such as pages, toner/ink, due to redundant printing. In the known solutions, there is no guarantee that any other user's job such as user B job is not printed in special media loaded by a different user, i.e., user A. In other words, the current solutions do not ensure that the user who loads the special media in a tray, only his document/job gets printed on his loaded media by the multi-function device. In this light, there is a need for improvised methods and systems to handle special media printing.

SUMMARY

The present disclosure discloses methods and systems for reserving a tray for a user for special media printing, the method is implemented at a multi-function device. The method includes receiving one or more special media sheets as loaded by the user in the tray. After loading the special media sheets, the tray ID of the tray is automatically identified. A user interface is provided to the user to input loaded media details. A user interface is further provided to the user to input his user ID. Finally, the identified tray is automatically reserved for the user using the user ID and the tray ID, for printing a document later received from the user using the reserved tray. The identified tray is automatically reserved for a pre-defined time or is automatically reserved till the document received from the user is printed successfully.

According to further aspects illustrated herein, a multi-function device for reserving a tray for a user for special media printing is disclosed. The multi-function device includes a plurality of trays including one or more media types, wherein at least one tray receives one or more special media sheets from the user for special media printing. The multi-function device further incudes a user interface provided to the user for: inputting loaded media details; and inputting a user ID of the user. The multi-function device further includes a controller for: automatically detecting the tray ID of at least one tray based on the one or more special media sheets loaded by the user; and automatically reserving at least one tray for the user for a pre-defined time using the user ID and the tray ID, for printing a document of the user on the one or more special media sheets as loaded in the at least one tray.

According to furthermore aspects illustrated herein, a method for reserving a tray for a user for special media printing is disclosed. The method is implemented at a multi-function device, the method includes receiving one or more special media sheets as loaded by the user in the tray. Based on the loaded special media sheets, a tray ID of the tray is automatically detected. A user interface is provided to the user to input loaded media details. Then, it is checked with the user whether to reserve the identified/detected tray for the user. Based on the response, a user interface is further shown to the user to input his user ID. The identified tray is automatically reserved for the user using the user ID for special media printing for the user. Then, one or more documents are received for printing from one or more users at the multi-function device. Then, user ID of each user is matched with the user ID mapped for the tray reservation. Based on the user ID matching, document of the corresponding user is printed using the one or more special media sheets in the reserved tray.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
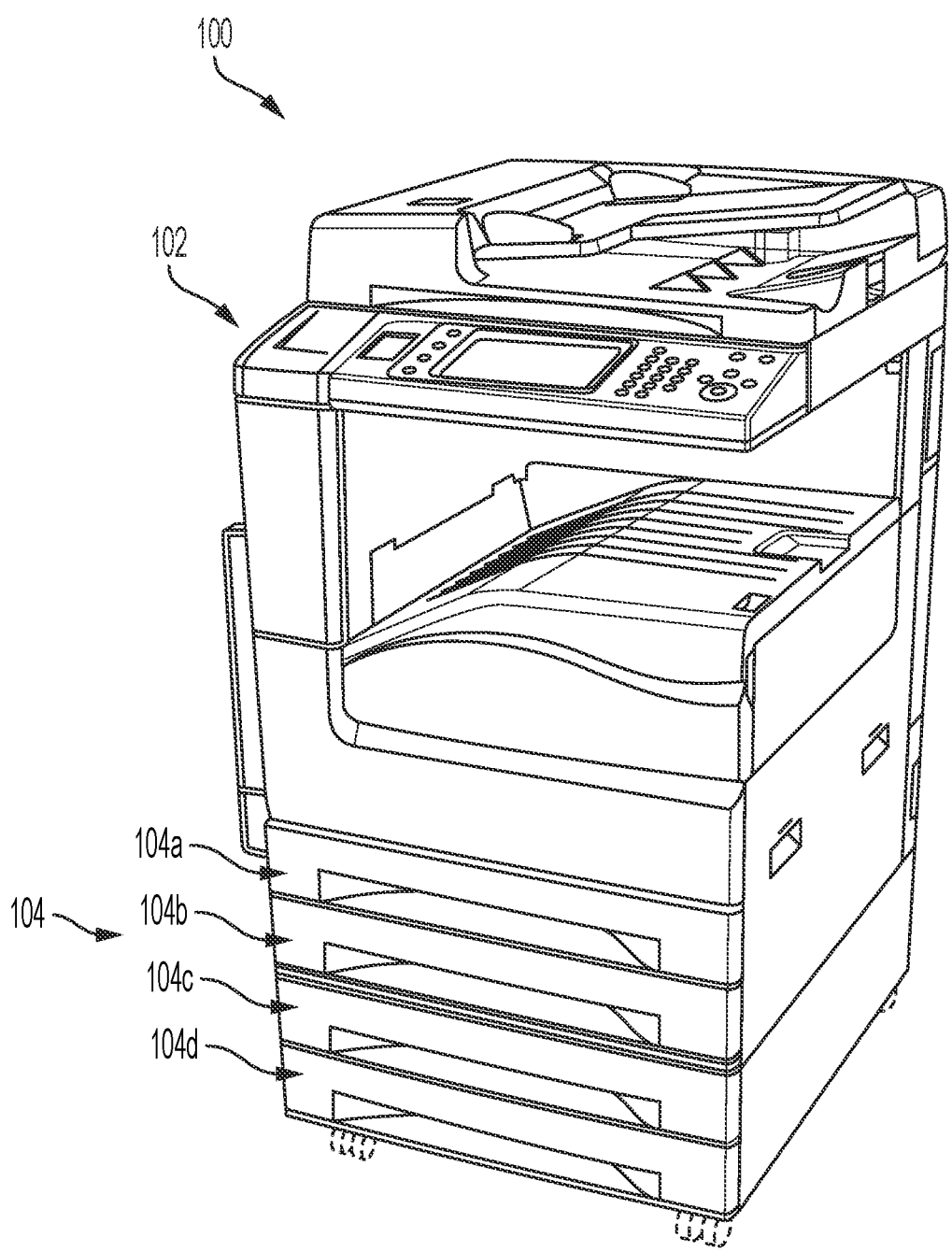
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device performing one or more functions such as, but not limited to, printing, imaging, scanning, copying and so forth. The multi-function device may include software, hardware, firmware, or a combination thereof. In the context of the current disclosure, the multi-function device includes a way that allows a user to reserve a tray for himself for printing his documents on special media. The tray is reserved such that the multi-function device prints one or more documents of the user (who reserved the tray) using the reserved tray instead of printing any other user's document using the reserved tray.

The term "special media" refers to a special type of paper on which a document or content can be printed. Various examples of the special media include letterheads, bond papers, transparent sheets, glossy sheets, cardstock, or the like. Typically, different special media is used for printing different types of content. For example, a job offer letter is to be printed on company's letterhead, but a legal document requires to be printed on legal bond papers.

As used herein, the term "details" or "the loaded media details" refers to one or more physical attributes of the media loaded by the user in a particular tray such as size of the media or other non-size related details such as media type or media color. The media size can be in any format such as A4 or its numerical measurements such as 210×297 mm, without limiting the scope. Examples of other media details/types include, but not limited to, New Paper Type 3, Custom 7, Transparency, Cardstock, Recycled, Pre-Printed, Heavy Glossy Cardstock, New Paper Type 4, Plain, Letterhead, Heavyweight Cardstock, Bond, Light Glossy Cardstock, Heavy Glossy Card Reloaded, New Paper Type 5, Hole Punched, Lightweight Cardstock, Heavy Cardstock Reloaded, Labels, Glossy Cardstock, or Lightweight as discussed below in FIG. 3A but excludes mere indications of size related information. Other examples of the media details include its color such as black, white, or any other color.

The term "reserve" refers to dedicating a tray for a particular user for printing his documents/content on special media sheets as loaded by him in that tray. The tray can be reserved for a pre-defined time or till documents of the user are printed successfully. Once the tray is reserved, no other user can print his document/content using the reserved tray or special media sheets in the reserved tray.

The term "mapping" refers to linking of a tray ID with a user ID for the tray reservation such that the corresponding user can print his document/content on special media sheets. Here, the tray ID refers to ID of the tray that the user wishes to reserve or where the special media sheets are loaded by the user; and the user ID refers to an ID of the user who wishes to reserve the tray for special media printing or who loads the special media sheets in the tray. The mapping also includes maintaining or storing the association of the tray ID with the user ID for later retrieval and/or use such as printing. The mapping may include additional parameters, for example, linking the tray ID with the user ID as well as with media type and so on.

The term "pre-defined time" refers to a time window till the tray is reserved for a particular user. The pre-defined time may be pre-set in the multi-function device or may be changed at later stages. The pre-defined time may be defined by the user who loads the special media sheets or may be defined by an admin user. For example, the pre-defined time may be 5 mins, 10 mins, 15 mins, 20 mins and so on.

The term "revoke" refers to making the reserved tray available for all users after the pre-defined time is lapsed or documents of the user are printed successfully.

The term "document" refers to any digital document submitted by the user for special media printing. The document may include content in the form of text, images, graphics, or a combination thereof. The document may be referred to as content without limiting the scope of the disclosure.

The term "computing device" refers to a device that a user typically uses for his day-to-day work, giving print commands and other purposes. Examples of the computing device include, but are not limited to, a personal computer, a desktop, a laptop, a mobile phone, a tablet, a Personal Digital Assistant (PDA), a smart-phone or any other device capable of data communication and/or print submission. The computing device includes a print driver application that allows the user to submit documents for printing, one or more print parameters, and so on.

Overview

The present disclosure discloses methods and systems for reserving a tray for a user for special media printing. The methods and systems allow the user to reserve the tray once one or more special media sheets are loaded by the user in that tray. The tray is reserved based on a user ID of the user. Once reserved, the tray having the user loaded one or more special media sheets is used only for printing content/document of the user who the tray is reserved for. For example, when a document is received from any user, user ID of the user is checked. If the user ID from whom the document is received matches with the user ID of the user for tray reservation, the document is printed using the special media sheets in the reserved tray. Otherwise, document of the user is printed using other media sheets/other available trays. The methods and systems ensure that the user who loads the special media sheets for printing his document/content, only his content gets printed in the special media sheets, thereby enhances accuracy and satisfaction for the user. The methods and systems restrict other users for printing their content/document (intended and/or unintended) on special media sheets loaded by the user in the reserved tray.

Exemplary Environment

FIG. 1 shows an exemplary environment 100 in which various embodiments of the disclosure can be practiced. The environment 100 includes a multi-function device 102 for performing various functionalities such as printing, scanning, copying, faxing, imaging, or other functionalities. The multi-function device 102 is just one example but the environment 100 may include a printer or any device with printing capabilities for implementing the present disclosure. The multi-function device 102 is shown to include multiple trays such as 104a, 104b, 104c, and 104d (collectively 104). The trays 104 may support all media types. Alternatively, the trays 104 may support specific media types and/or media sizes. The trays 104 may include same media types and/or sizes or may include different media types and/or sizes. For example, the trays 104a and 104b may include A4 media type and the tray 104c may include A3 media type, and the tray 104d may include glossy media. In another example, the trays 104a, 104b, and 104c may include A4 media but of various sizes, and the tray 104d may include A3 media. In some implementations, any of the trays 104a, 104b, 104c, and 104d may be a dedicated tray in context of media sizes. For example, the tray 104b may support media size 216×279 mm but other trays such as 104a, 104c and 104d may support all media types and/or sizes. These are few examples, but other variations may be implemented without limiting or deviating from the scope of the disclosure.

In context of the current disclosure, the multi-function device 102 reserves a tray for a user for special media printing. Specifically, the multi-function device 102 reserves a tray for a user for printing his documents on special media sheets loaded by him in that tray. Various examples of the special media sheets include letterheads, legal bonds, transparent sheets, glossy sheets, cardstock, glossy cardstock, or the like.

In implementation, the user loads one or more special media sheets, say, letterheads, in a tray such as tray 104a. The multi-function device 102 automatically identifies tray ID of the tray, receives loaded media details from the user and his user ID and automatically reserves the identified tray for the user using the user ID and the tray ID. When any document for printing is received at the multi-function device 102, the multi-function device 102 first checks a user ID from whom the document is received and prints his document on the loaded special media sheets using the reserved tray on successful matching of the user ID. Otherwise, the multi-function device 102 prints the document using other available trays.

For example, the multi-function device 102 checks whether the tray reservation is set for the given user ID. If no, the multi-function device 102 picks media sheets from other available trays and initiates printing his document. If yes, the multi-function device 102 picks the special media sheets from the reserved tray and initiates printing his document.

By printing the received document from other users using other available trays, the multi-function device 102 restricts other users for using the reserved tray till document of the user gets printed successfully and this ensures that intended document/content/job gets printed on the special media sheets. Thereby, reducing the chances of error in the media swapping or printing on wrong media. More structural and implementation details of the disclosure will be discussed in FIG. 2.

An example is considered for understanding purposes without limiting the scope of the disclosure. It can be considered that a user such as user A loads 2 glossy papers in a tray such as 104d, for printing his photos. Based on the loaded sheets, the multi-function device 102 reserves the tray 104d for the user A using his user ID. Till the time, the tray is reserved for the user A, the multi-function device 102 does not proceed with printing document of any other user (such as user B, user C, user D and so on) using the reserved tray 104d. In one example, the multi-function device 102 may ignore the user-B's job as the tray 104d is reserved for the user A. In other examples, the user B job may be printed from other available trays such as tray 104a, 104b and 104c, even if the media attributes are the same. In further examples, the multi-function device 102 holds printing of the user B document till the tray 104d is reserved for the user A. And once the reserved tray 104d is free, the multi-function device 102 proceeds with printing document of the user B using the tray 104d.

The term "user" refers to a user who wishes to print his content on special medial sheets using the reserved tray or refers to a user who reserves a tray for his special media printing. Remaining users can be referred to as "other users".

Exemplary System

Figure 2:
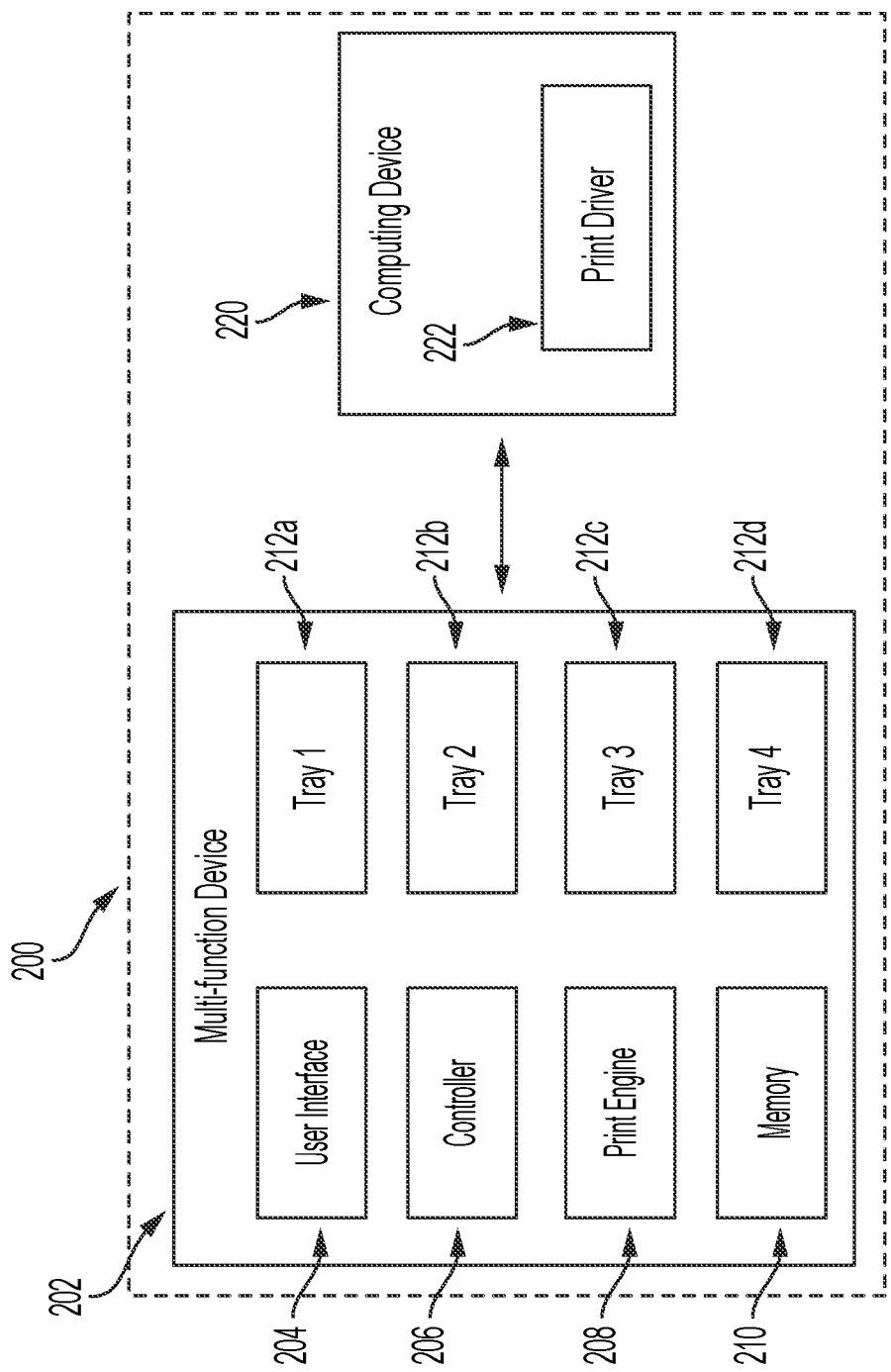
FIG. 2 is a block diagram illustrating various components of a system for reserving a tray for a user for special media printing, in accordance with an embodiment of the present disclosure.

FIG. 2 is a block diagram illustrating various components of a system 200 including a multi-function device 202 which is communicatively coupled to a computing device 220 via a communication network, although not shown. The communication network may be a wireless network, a wired network or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As shown, the multi-function device 202 includes a user interface 204, a controller 206, a print engine 208, a memory 210, and multiple trays such as 212a, 212b, 212c and 212d (collectively 212). The trays 212 may be referred to as input trays for inputting media sheets for printing purpose. The multi-function device 202 may additionally include an output tray or an output area (although not shown) where all printed papers are output. The components 204-212 are connected to each other via a conventional bus or a later developed protocol and communicate with each other for performing various functions of the present disclosure. The multi-function device 202 may include additional component(s) as required to implement the present disclosure. Also, the multi-function device 202 may perform functions and operations like the multi-function device 102 discussed in FIG. 1. Like the multi-function device 202, the computing device 220 includes a print driver 222 that allows users to submit one or more documents for printing to the multi-function device 202 and/or other multi-function devices connected to the computing device 220.

Each tray 212 may include various media sheets of various sizes and/or various colors. The trays 212 are loaded with media sheets by one or more users and/or admin user. The tray 212a may be referred to as tray 1 for A4 media sheets, the tray 212b as tray 2 for A3 media sheets, tray 212c as tray 3 for A4 media sheets again and tray 212d as tray 4 for special media sheets. Each tray 212 may support all media types and/or sizes. Any tray 212 may be a dedicated tray for special media printing or printing documents on special media sheets. Alternatively, the trays 212 may support special media printing even if the tray includes regular media sheets such as A4 sheets. For example, if the tray 212a includes A4 sheets but the tray 212a may support other media types such as letterheads, custom, legal bond, bond, glossy papers and so on.

At Multi-Function Device Side

The implementation begins when a user loads one or more special media sheets in a tray 212 of the multi-function device 202. In one example, the user may load the letterhead in the tray 212a of the multi-function device 202. For loading, the user opens the tray 212a, puts one or more media sheets in the tray 212a and closes the tray 212a. Upon closing the tray, the controller 206 automatically identifies the tray accessed by the user and automatically identifies tray ID of the tray 212a, for example, tray 1. The user may load any number of media sheets based on his choice and/or requirement of the user. For example, the user may load 1 letterhead, 2 letterheads, or 5 letterheads in the tray 1.

Figure 3A:
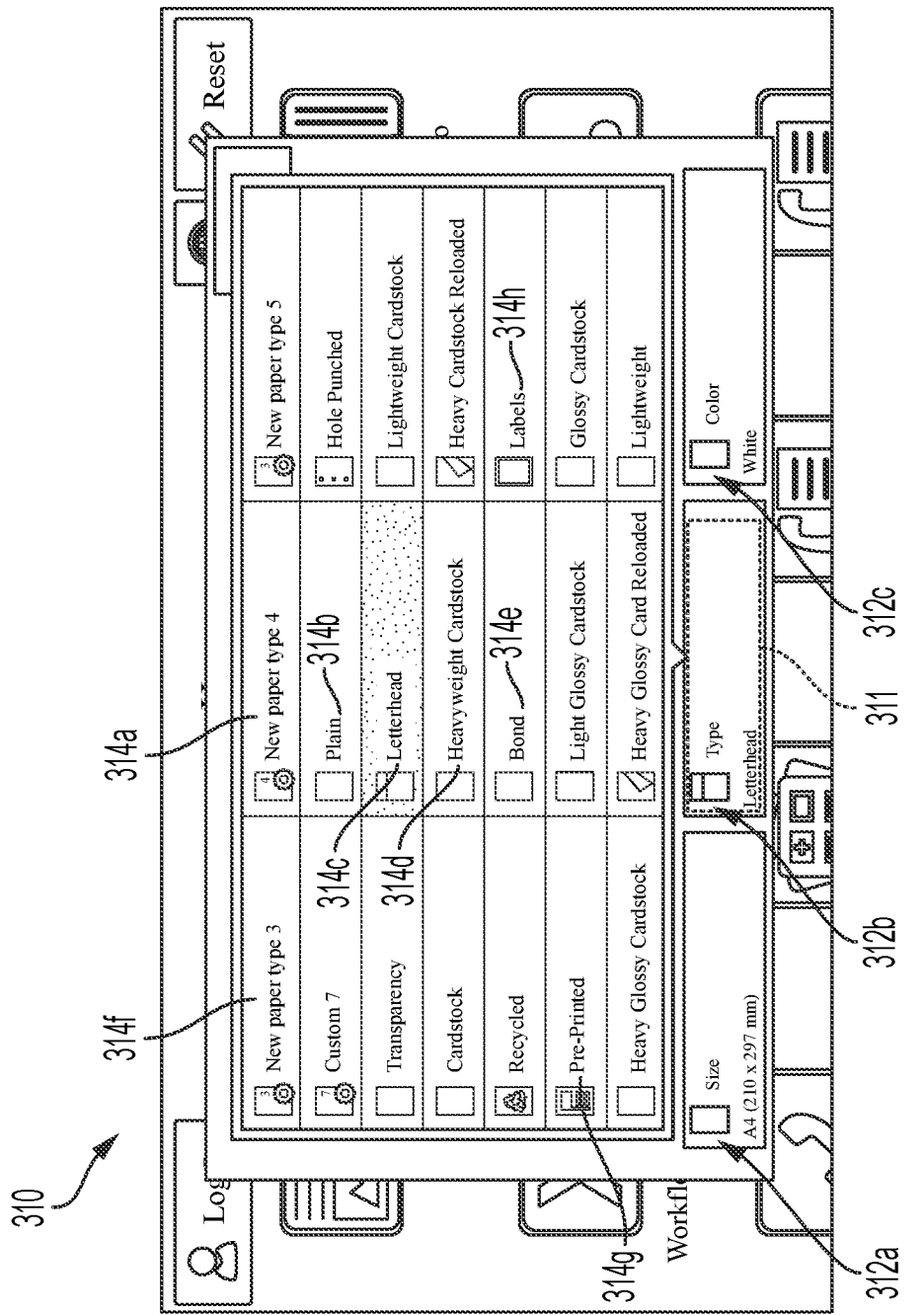
FIGS. 3A-3G are exemplary snapshots for implementing the current disclosure.
Figure 3B:
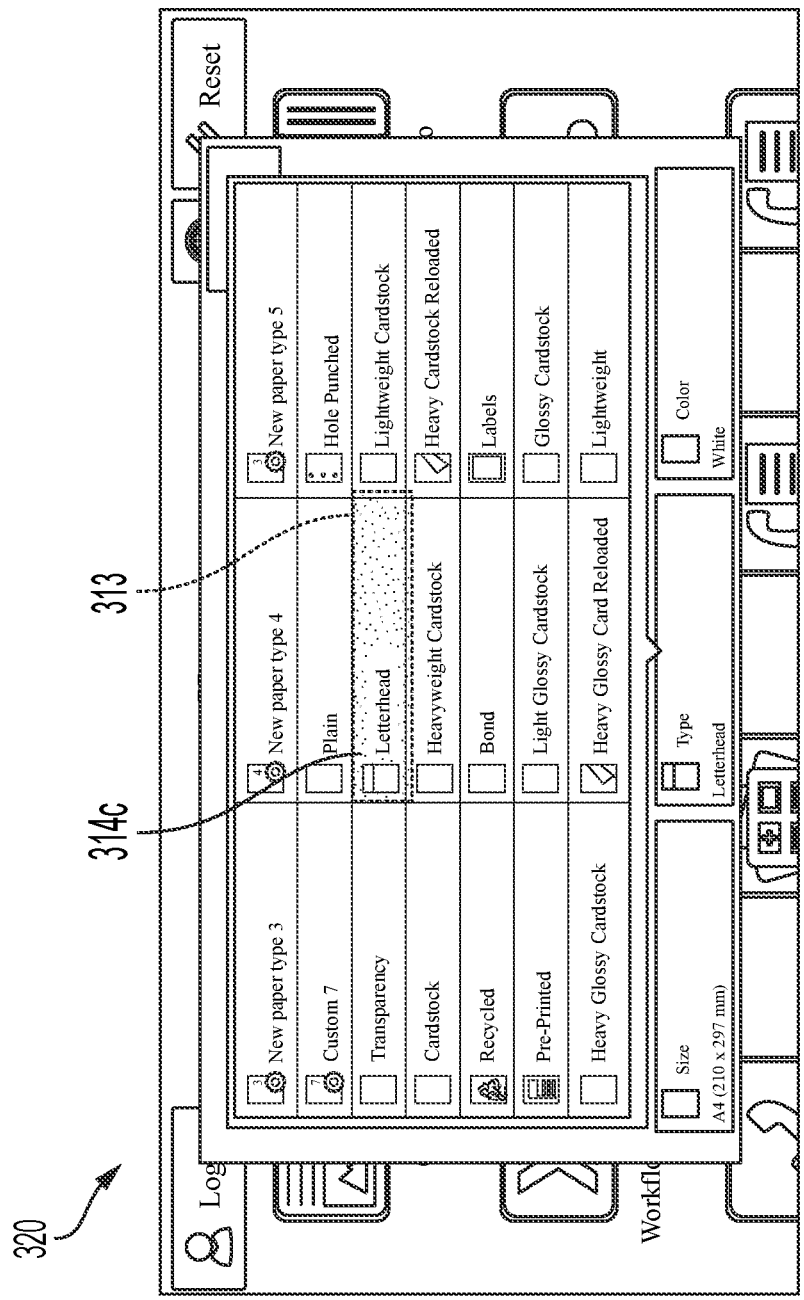
Figure 3C:
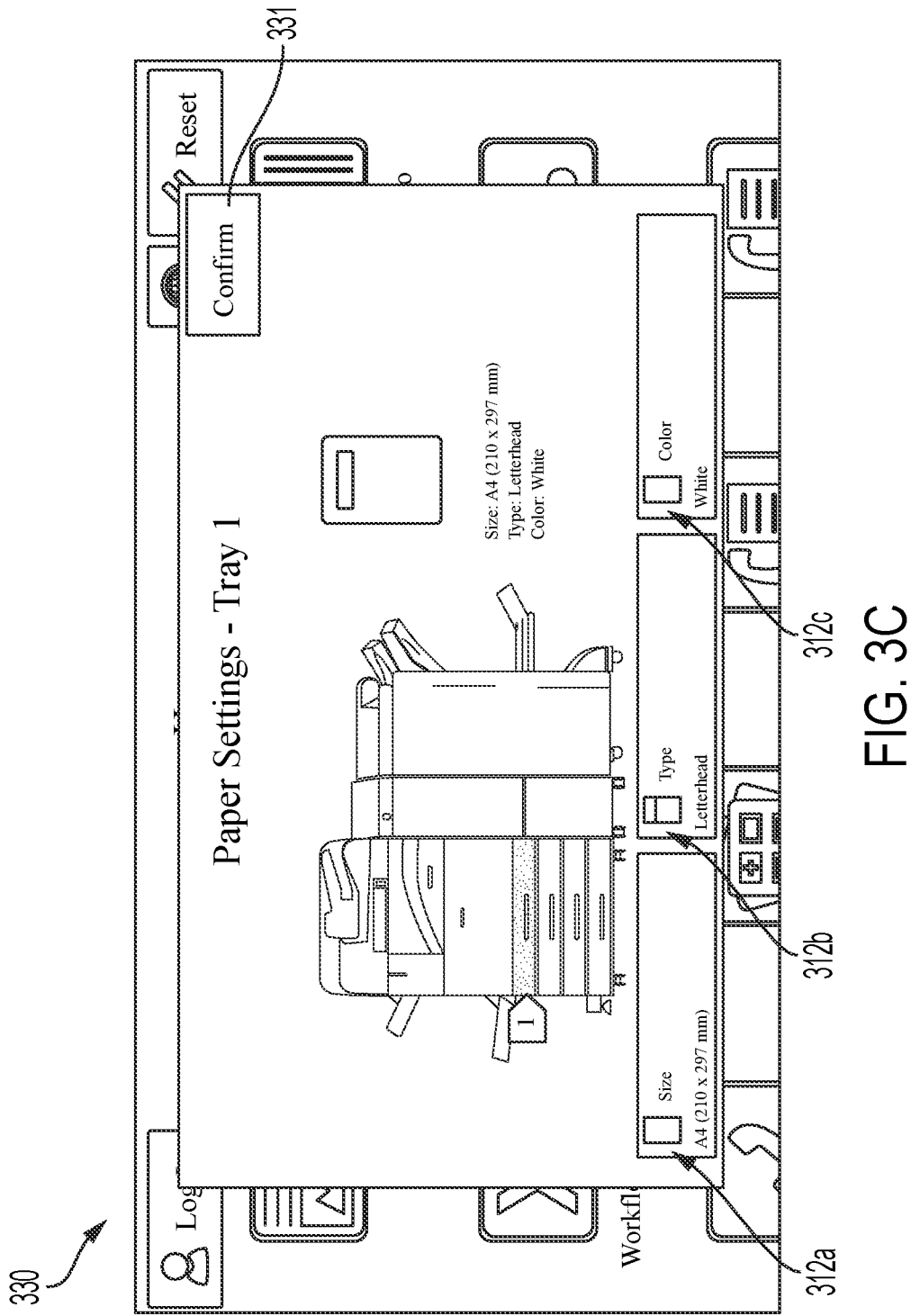

The user is then presented with the user interface 204 to input or select loaded media details such as media type, media size and media color. The details can be size or non-size related information of the loaded media. The user can select the media type corresponding to media sheets he has loaded in the tray 212a (or tray 1). For example, if the user loads the letterhead in the tray 1, the user selects the letterhead. If the user loads the bond, the user selects the bond media sheet. One such exemplary user interface 310 displaying media details such as such as media size (312a), media type (312b), and color (312c) for user's selection is shown in FIG. 3A. The user interface 310 is displayed to the user when the user opens and/or closes the tray. As shown, the user selects the option media type 312b (selection shown via dotted lines, marked as 311) through the user interface 310. Upon selection of the option 312b, the interface 310 lists all media types that the multi-function device 202 or trays 212 support for printing. Few examples of the listed media include new paper type 4 (marked as 314a), plain (marked as 314b), letterhead (314c), heavyweight cardstock (314d), bond (314e), new paper type (314f), pre-printed (314g), labels (314h) and so on. The user then selects a media type such as letterhead 314c (selection marked as 313) from the listed media (collectively 314) as shown in the user interface 320 of FIG. 3B. Once selected, another user interface such as 330 is shown to the user such as FIG. 3C. The interface 330 shows media details such as media type (letterhead), color (white), and size (210×297 mm) for user confirmation. The user interface 330 includes a confirmation option (marked as 331) that the user can select to provide his confirmation that the media details are correct.

Figure 3D:
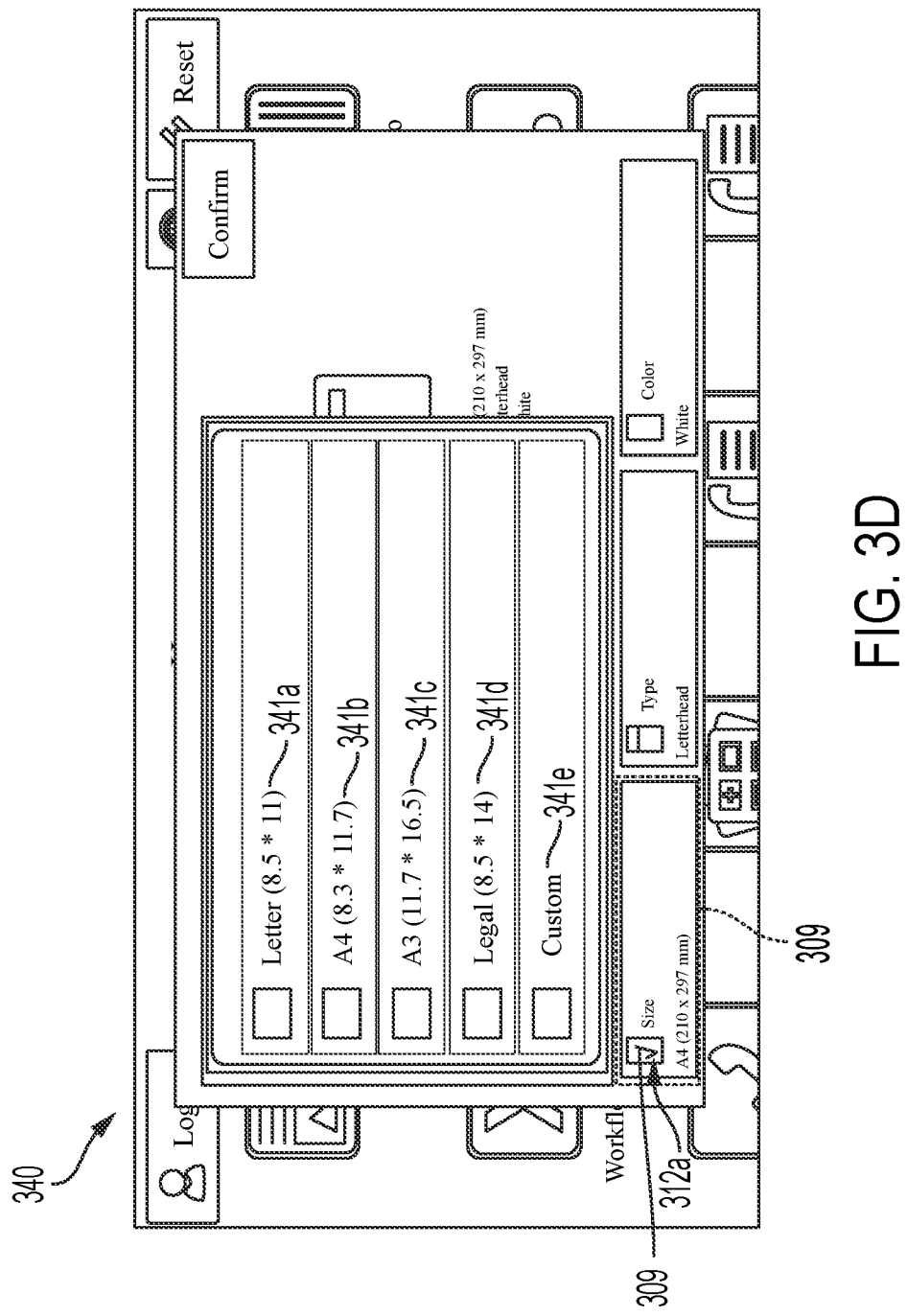

The selection of media type is just one example; the user can select media size as an option as shown in the interface 340 of FIG. 3D. As shown, the user selects the option media size 312a (selection shown via 309). Based on the user's selection, media types along with corresponding media sizes (341a, 341b, 341c, 341d, and 341e, collectively 341) are displayed to the user in the user interface 340. This way, the loaded media details are provided or input by the user through the user interface 204 shown at the multi-function device 202.

Figure 3E:
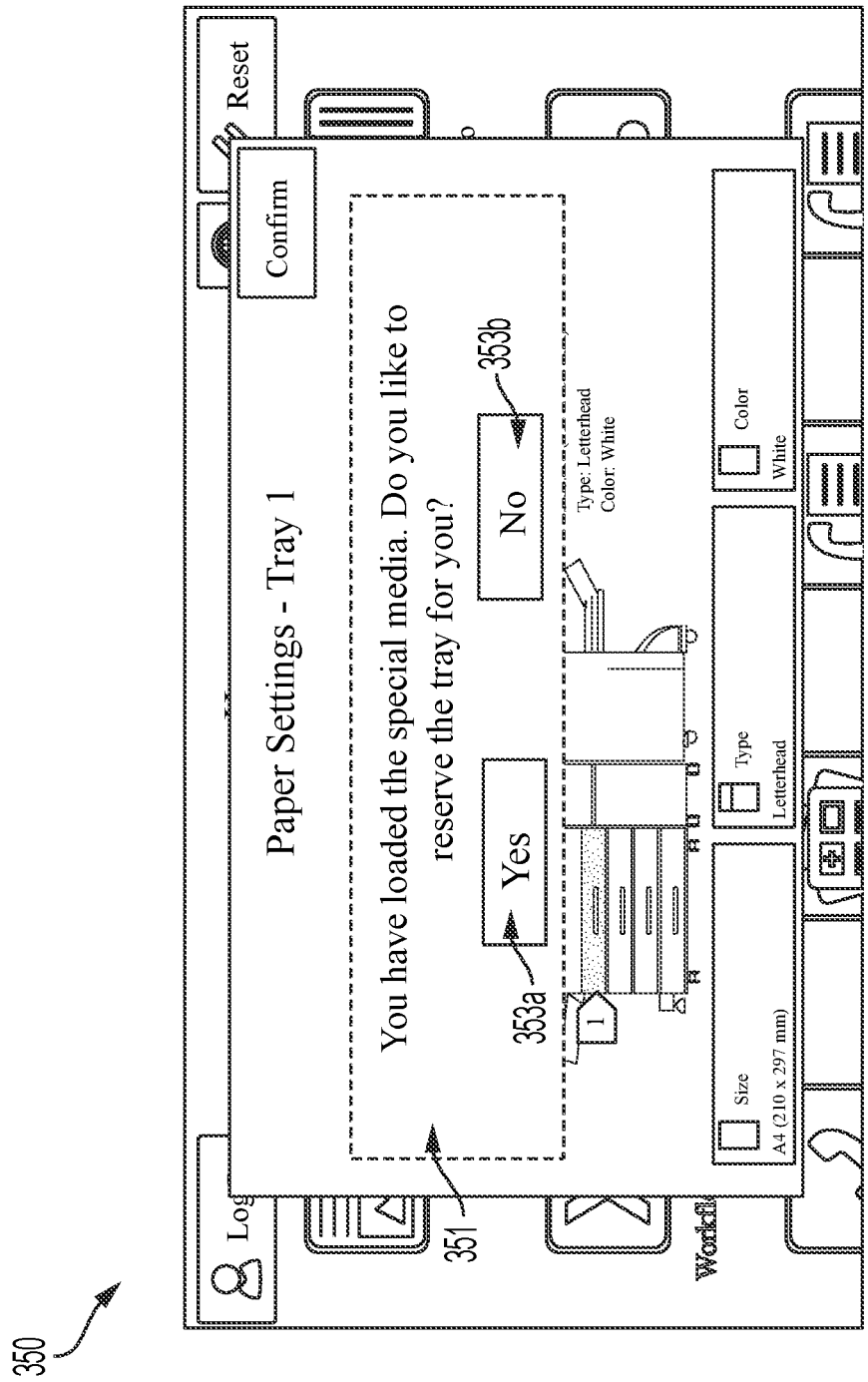
Figure 3F:
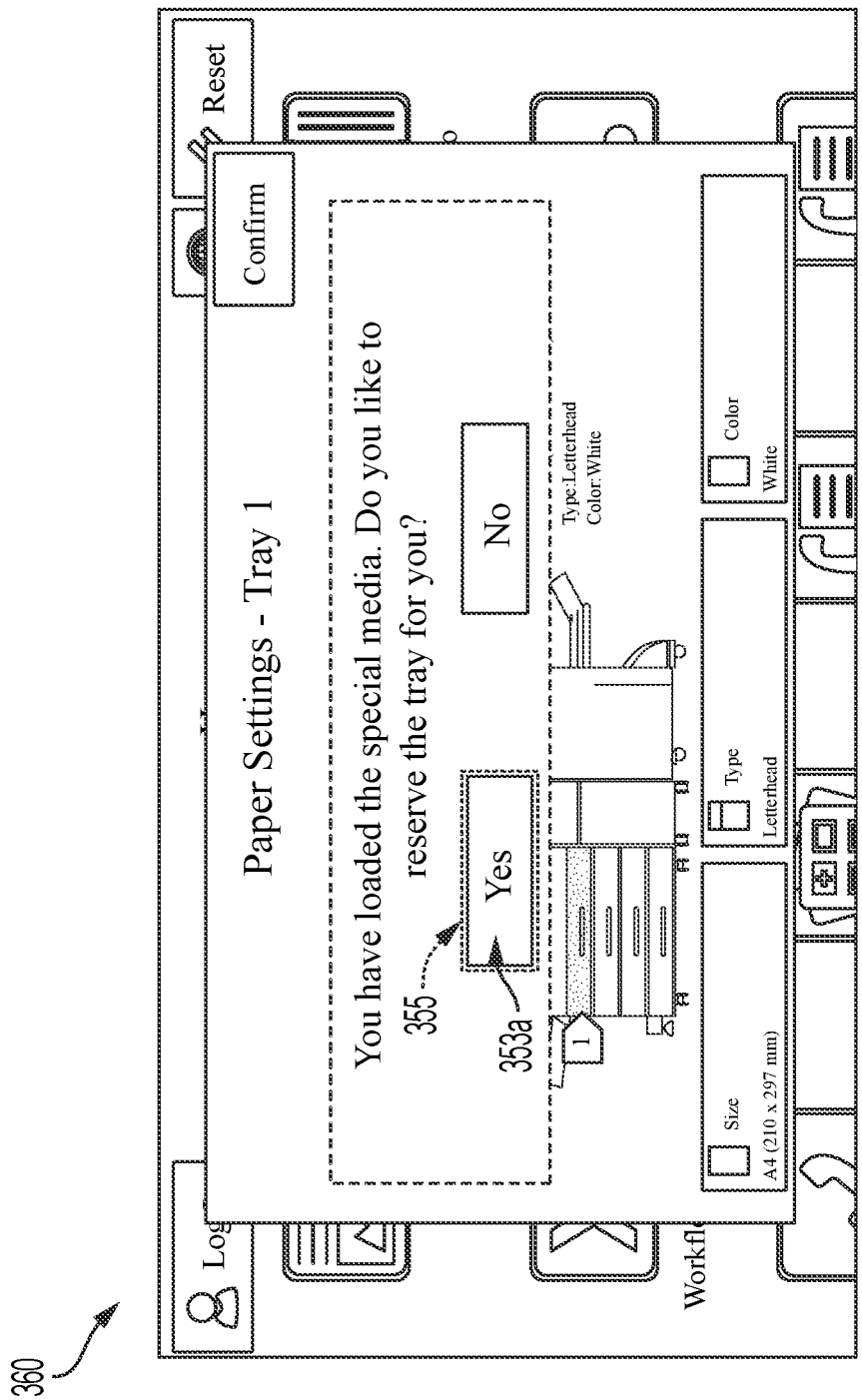

After receiving the media details from the user, the controller 206 then checks with the user whether to reserve the tray for him for special media printing, letterhead in this case. If the user wants to reserve the tray, the user can provide his confirmation through the user interface 204. One such exemplary interface 350 is shown to the user in FIG. 3E. According to the interface 350, a pre-defined message such as 351 along with options 353a and 353b are shown to the user. The message 351 includes "you have loaded the special media. Do you like to reserve the tray for you?" The user can select the option yes (marked as 353a) if he wishes to reserve the tray for himself. Else, the user can select the option No, marked as 353b. As further shown in the snapshot 360 of FIG. 3F, the user selects the option 353a, the selection shown via 355. Based on the response from the user, the controller 206 proceeds further. In context of the present disclosure, the user proceeds with the tray reservation.

Figure 3G:
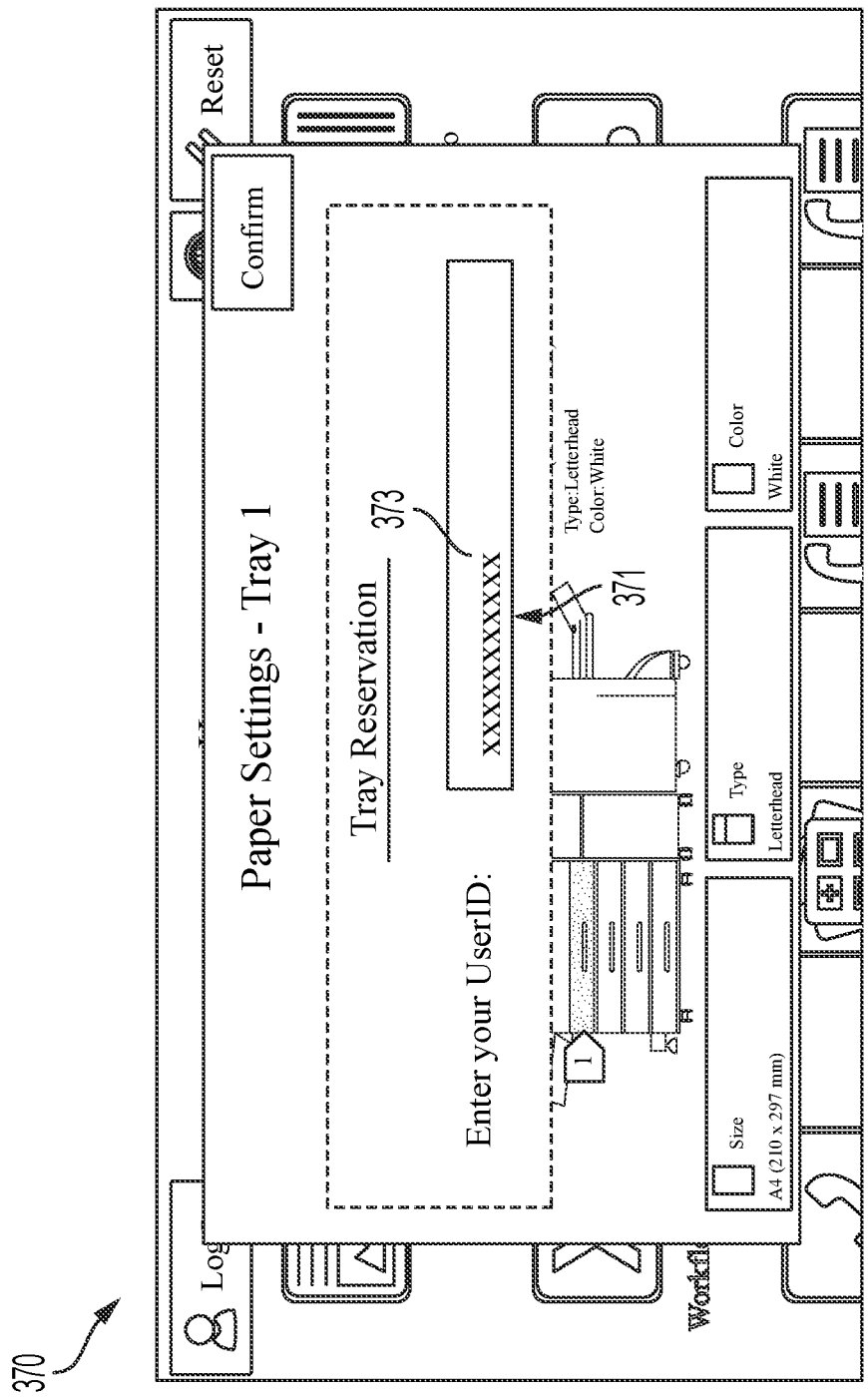

If the user wants to reserve the identified tray, the controller 206 then presents another user interface to the user to input his user ID. The user can input his ID for tray reservation, as shown in the snapshot 370 of FIG. 3G. As shown, the user inputs his user ID, marked as 373 in the given textbox 371. The user ID can be employee ID, employee code, email address, username, or the like. The user ID can be of any length or may have alphabets, numbers, special characters, or a combination thereof. The user ID can be any ID of the user that can help identify identity of the user who reserves the tray.

The controller 206 then performs a mapping between the user ID and the tray ID to establish a connection between the user and the tray for later use/retrieval. The mapping can help identify which tray is reserved for a particular user or can help identify the user for which a particular tray is reserved for. The mapping may include additional details such as media type, other details of the user, pre-defined time, or the like. The controller 206 further stores the mapping of the user ID, the tray ID, and the media type for later retrieval. In other words, the controller 206 temporarily stores the tray ID of the reserved tray and ID of the user for whom the tray is reserved in the memory 210. Once mapping is performed, the controller 206 automatically reserves the tray for the user using the user ID and tray ID for special media printing by the user at later time. The controller 206 reserves the tray for the user for a pre-defined time or till document of the user is printed successfully. The controller 206 reserves the tray such that no other user can print their documents/content on the special media sheets as loaded by the user in the tray 212a. In other words, the tray 212a is not available for any other users for special media printing for the pre-defined time. Once the tray 212a is reserved for the user, other users can neither reserve the tray 212a nor use the media sheets loaded in the tray 212a. This way, the controller 206 successfully reserves the tray 212a for the user. Once reserved, the controller 206 may change the status of the tray 212a to "reserved" for easy identification while printing and may keep status of other trays as "available". Here, the tray 212a is reserved tray and trays 212b, 212c and 212c are referred to as available trays.

The controller 206 may additionally display a message via the user interface 204 to the user confirming that the tray 212a i.e., tray 1 is reserved for the user for special media printing and further requests him to send the document for printing from his device.

In some examples, the controller 206 may prompt the user via the user interface 204 of the multi-function device 202 to extend the pre-defined time of the tray reservation. If the user does not provide any response, the controller 206 revokes the reservation of the tray after the pre-defined time is lapsed. The pre-defined time may be extended when the user wishes to print more documents using the special media as loaded by him. In such cases, the user may choose an option "Remind me later" option as displayed to him via the user interface 204 of the multi-function device 202. As a result, the pre-defined time for the tray reservation is extended for the user. For example, if initially the tray is reserved for 15 minutes, the extended time may be additional 10 minutes. So overall, the total time of the tray reservation for the user is 25 minutes.

At Computing Device Side

The user uses the computing device 220 for submitting a document for printing. The document can be in any suitable format such as Portable Document Format (PDF), Microsoft DOC format, Hypertext Markup Language (HTML) format, Extensible Markup Language (XML) format, Microsoft XLS format (MS-XLS), Tag Image File Format (TIFF), etc. Specially, the user submits the document for printing through the print driver 222. Through the print driver 222, the user submits one or more print attributes such as print all pages, orientation, destination, output, quality, color, and media type. The user selects the media type and automatically media sizes are selected. Once all the print attributes are selected by the user, the document along with the print attributes are sent to the multi-function device 202 for printing. While sending these details, the print driver 222 sends a user ID of the user. The user ID may be employee ID, employee code, username, or the like.

The multi-function device 202 receives the document, the print attributes, and the user ID. Specifically, the controller 206 receives the document, the print attributes, and the user ID. The controller 206 adds the received document for printing in a job queue at the multi-function device 202. The controller 206 further checks whether the document received for printing is from the same user, who reserved the tray 212a at the multi-function device 202. Here, the controller 206 matches the user ID of the user from whom the document is received with the user ID stored/mapped for the tray reservation. If matches, it confirms that the user from whom the document is received is the same user who reserved the tray for himself. Subsequently, the controller 206 instructs the print engine 208 to print the document using the special media sheets loaded by the user in the reserved tray 212a. The print engine 208 picks the special media sheets, for example—letterheads, from the reserved tray 212a for printing and successfully prints the document of the user.

Post this, the controller 206 automatically revokes the reservation of the tray 212a once the document of the user is successfully printed at the multi-function device 202. The controller 206 may change the status of the tray 212a from "reserved" to "available". Subsequently, the tray 212a is made available for all users for any media printing including special media printing. Upon successful completion, the tray 212a is rollback to previous state i.e., "not reserved", or "available" by removing all restrictions as set part of the tray ID and user ID mapping.

Referring back, if the user ID of the user from whom the document is received does not match with the user ID stored for the tray reservation, the controller 206 proceeds with conventional ways of printing. This indicates that the user from whom the document is received is different from the user who the tray is reserved. Subsequently, the controller 206 instructs the print engine 208 to print the document of the user using other available trays such as 212b, 212c, and 212d. Alternatively, the controller 206 may instruct the print engine 208 to print the document of this user when the tray 212a is available.

In some implementations, the controller 206 may additionally check whether the pre-defined time is lapsed or not. If lapsed, the controller 206 proceeds with conventional ways of printing. The controller 206 automatically revokes the reservation of the tray if the pre-defined time is lapsed. For example, if the pre-defined time is 5 mins and the user does not submit any document for printing within 5 minutes after the tray is reserved for him, the controller 206 automatically revokes the reservation of the tray and makes the tray available for all users. If pre-defined time is not lapsed, the controller 206 checks for the user's document and proceeds with printing the received document on the special media sheets in the reserved tray for the user.

This way, the multi-function device 202 reserves the tray for the user and manages special media printing for the user using the reserved tray.

In some examples, the controller 206 may revoke the tray reservation based on user's input. For example, when the user goes to collect his printed document, a prompt is shown to the user seeking his confirmation on whether the tray reservation can be revoked. Based on the user confirmation, the tray is made available for all users. The status of the tray may be changed from "reserved" to "available".

If the user does not confirm for revoking the tray reservation, a user interface is shown to the user asking if he wishes to print more than one document using the special media sheets. Then, the controller 206 displays a remind me later option to the user through the user interface 204. The reminder can be set for a pre-defined time such 15 mins. The user can select that option. Based on the selection of the reminder option, a prompt is shown to the user after a regular interval such as 5 mins, 10 mins, and 15 mins. If the user does not respond to the reminder within 15 mins, the controller 206 may automatically revoke the tray reservation.

As discussed above, the tray can be reserved for the given user ID until he completes printing his documents using the reserved tray. The tray can be reserved until special media is taken out from the reserved tray. The tray can be reserved for the pre-defined time. These are few examples for the tray reservation but other variations to these may be implemented. The tray is reserved based on the tray ID and the user ID.

The user interface 204 further allows the user to input various details such as media details, user ID and other relevant details required for implementing the present disclosure. For example, the user interface 204 allows the user to perform various selection in context of the current disclosure such as media type, media type, media color, or whether he wishes to reserve the tray and so on. The user interface 204 further displays various messages to the user as relevant for implementing the current disclosure.

The memory 210 stores all relevant information required for implementing the current disclosure. For example, the memory 210 temporarily stores the tray ID of the reserved tray along with the user ID and/or media type. Specifically, the memory 210 stores a mapping between the user ID, tray ID and the media type for later retrieval by the controller 206 or the multi-function device 202. The memory 210 further stores trays ID of all trays and corresponding media details available in the trays 212. Any details stored in the memory 210 may be retrieved by the controller 206 as and when required for implementing the current disclosure. These are few examples, but the memory 210 may store other relevant details/information required for implementing the current disclosure.

Although the disclosure is discussed with respect to scenarios where the user sends a document for printing from a different device (such as computing device 220) after the tray reservation activity is completed at the multi-function device 202. But the disclosure can be implemented where the user can directly select the document through the multi-function device 202. For example, the document for printing can be selected from the memory 210 of the multi-function device 202 or from a cloud location accessible via the multi-function device 202. The user can also plug his portable storage device to the multi-function device 202 and can select the document for printing. These are few examples but other variations of these may be implemented.

Additionally, the disclosure is discussed with respect to a single document for special media printing, but the user can send more than one document for special media printing after the tray reservation, without deviating from the scope of the disclosure.

The components 204-212 as discussed above are exemplary in nature. But the multi-function device 202 may include more or lesser number of components. For example, the functionality of the controller 206 may be directly incorporated in the multi-function device 202. As a result, the multi-function device 202 implements the functionality of the tray reservation for the user for special media printing.

Exemplary Flowcharts

Figure 4:
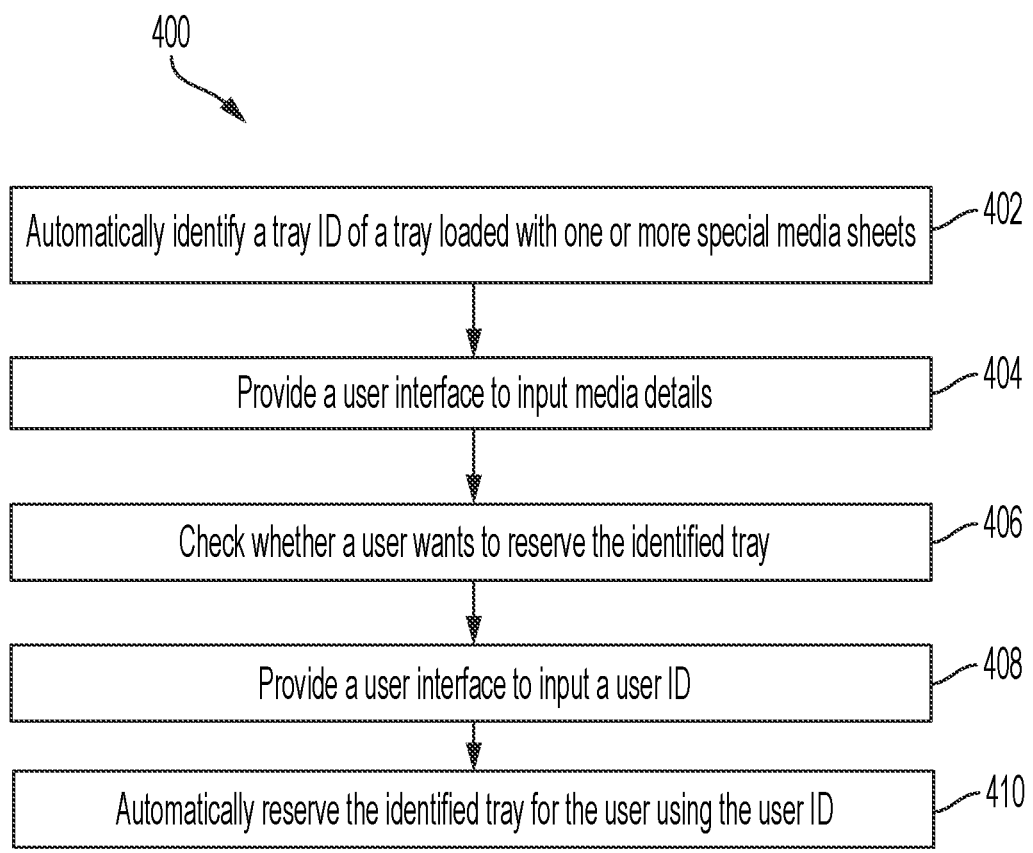
FIG. 4 is an exemplary method flowchart for tray reservation for a user for special media printing.

FIG. 4 is a method flowchart 400 for allowing a user to reserve a tray for special media printing. The method 400 may be implemented at a multi-function device such as 102 or 202.

1. Initially, a user loads one or more special media sheets in a tray at the multi-function device. At 402, a tray ID of the tray is automatically identified/detected based on the loaded media sheets by the user. The tray is identified based on the tray ID accessed by the user at the multi-function device. The multi-function device includes multiple trays, and each tray may have different tray ID. The tray ID can be in the form of number, alphabets, alphanumeric or the like. At 404, a user interface is provided to the user to input media details such as media size, type, and color. The media details of the loaded media sheets are input by the user. Once the user provides the media type, at 406, it is checked whether to reserve the tray for the user. Based on the check, a user interface is further provided to input user ID at 408. Upon receiving the user ID, the identified tray is automatically reserved for the user at 410. The tray is reserved for the user using the user ID and the tray ID. The tray is reserved for printing a document later received from the same user on the one or more special media sheets as loaded in the identified/reserved tray. The later may be considered as a time after the tray is reserved. When any document is received after the tray reservation, user ID is checked before printing the document using the reserved tray. For example, it is checked if the user ID of the user from whom the document is received for printing matches with the user ID stored for the tray reservation. Based on successful matching of the user ID, the document received from the user is successfully printed on the one or more special media sheets loaded in the reserved tray. If the user ID of the user from whom the document is received is different from the user ID stored for the tray reservation, the document is printed on one or more other media sheets.

This method 400 allows the user to reserve the tray for himself for special media printing such that no other user can print his document using the reserved tray. More details will be discussed below in conjunction with FIG. 5.

Figure 5:
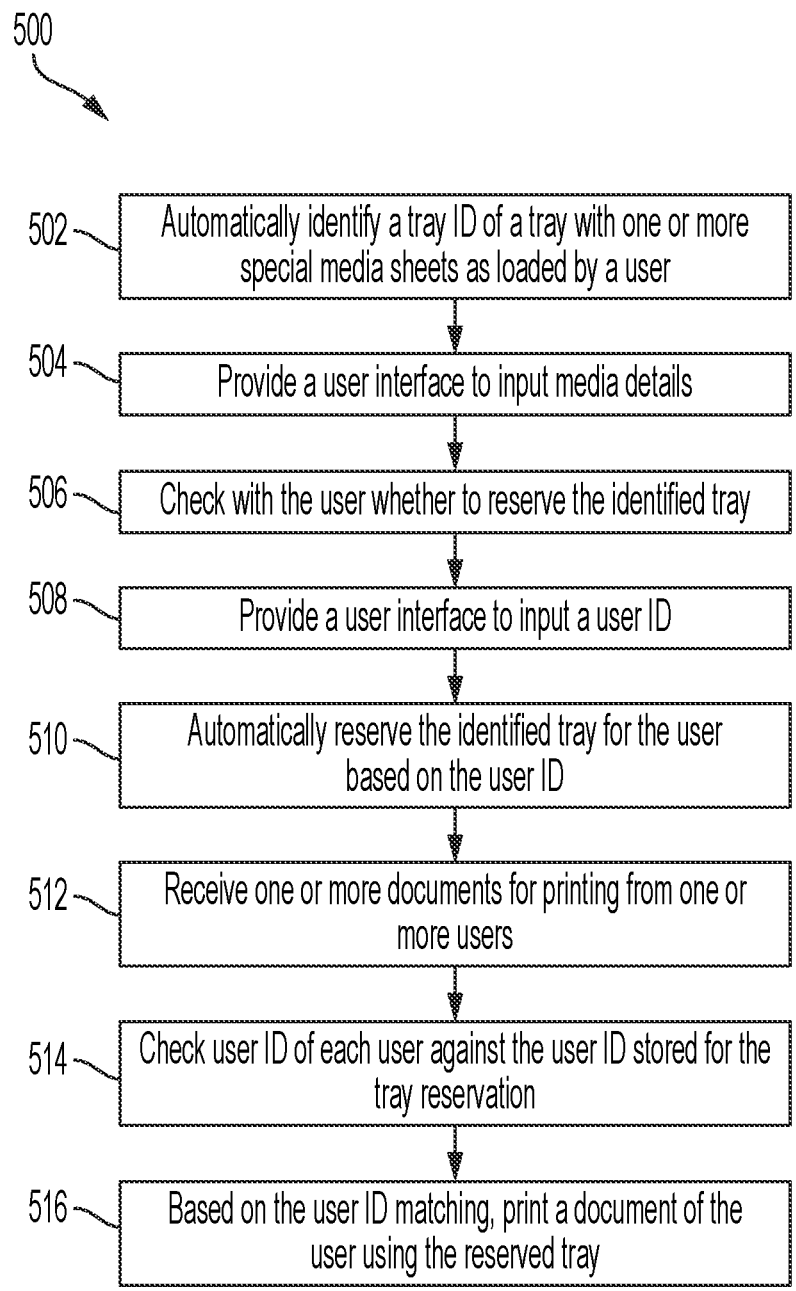
FIG. 5 is a complete method flowchart for reserving a tray for a user and printing his document using the reserved tray.

FIG. 5 is a method flowchart 500 for reserving a tray for a particular user for special media printing. The method 500 may be implemented at a multi-function device, such as the multi-function device 102 of FIG. 1, or the multi-function device 202 of FIG. 2. However, the method 500 can be implemented at any equivalent device with printing functionalities.

The method 500 begins when a user, say user A, wishes to print a document on a special media, for example, legal bond paper. The user A accesses the multi-function device to check whether any tray in the multi-function device has legal bond paper. If so, the method 500 proceeds further. If not, the user A loads one or more special media sheets such as legal bond papers in a tray. The tray may be any tray in the multi-function device that can be used for special media printing. In one example, the tray may be a dedicated tray which is typically used by the multi-function device for special media printing. Otherwise, the tray can be any other tray of the multi-function device. This way, the special media sheets are loaded by the user A in the tray. Once loaded, at 502, a tray ID of the tray is automatically detected. The tray ID/tray is identified based on the user action, opening and closing of the tray for loading or checking the media sheets.

Once loaded, at 504, a user interface is provided to the user A to select/input media details such as media type, media size and media color. Various examples of the media type may be letterhead, legal bond paper, pre-printed papers, glossy papers, light glossy cardstock, cardstock paper, envelopes, transparencies, custom media, and labels, and so on. Various examples of the media sizes may be 76.2×127.0 mm, 210 m×297 mm, 215.9×355.6 mm, 15×280 mm and so on. Similarly, various examples of the media color may be black, white, or any other color. For example, letterhead media type may have a size of 215.9×279.4 mm, tabloid as 279.4×431.8 mm, legal as 215.9×355.6 mm, executive as 184.15×266.7 mm, B4 media type as 257×364 mm and so on. The user interface displays a list of various media types to the user A, the user can select his desired special media type such as letterhead from the list. The user A can similarly provide other media details such as media size and the media color through the user interface.

Then at 506, it is checked whether to reserve the tray for the user, based on the loaded media sheets by the user in the tray. If the user confirms to reserve the tray, the method 500 proceeds further, else the method 500 proceeds with conventional way of printing. In the current disclosure, the user confirms to reserve the tray for special media printing.

At 508, a user interface is provided to the user A to input his user ID. The user ID may be his employee ID, employee code, username, email address, phone number, or any other user ID which is typically used for submitting a document for printing through a print driver. Once the user ID is received, mapping is performed between the user ID, and the tray ID. The mapping is stored for later retrieval. After this, the tray, for example, tray 1, is automatically reserved for the user A, at 510. The tray may be reserved for a pre-defined time or till the document of the user is successfully completed. The pre-defined time may be for 5 mins, 10 mins, 15 mins and so on. The tray is reserved for the user A such that any content received from other users such as user B is not printed on the special media sheets loaded by the user A in the reserved tray, i.e., tray 1. Here, other available trays may be used for printing the documents received from other users such as user B. The identified tray may be reserved by automatically locking the tray for the user A for the pre-defined time.

Once the tray is reserved for the user A, the user A is informed about that the tray is reserved for him for the pre-defined time, say 5 mins.

At 512, one or more documents are received for printing from one or more users, for example, user A and user B.

For example, the user A submits one or more documents to the multi-function device for printing. The user A submits a document for printing from his computing device. While submitting the document for printing, one or more print attributes such as media type, output destination, quality, color, 2-sided print, page range, orientation etc. are selected by the user A. The media type may be letterhead. Then, the document along with the print attributes are submitted from computing device to the multi-function device. Along with the document and the print attributes, user ID of the user A is submitted by the print driver. This way, the multi-function device receives the document from the user A for printing along with the print attributes and the user ID of the user A. Similarly, multi-function device receives a document from the user B.

Once received, both the documents received from the user A and user B are added in a job queue at the multi-function device. At 514, user ID of each user i.e., user A and user B is checked against the user ID mapped/stored against the tray reservation. Here user ID of the user A and the user ID of the user B is compared with the user ID stored against the reserved tray i.e., tray ID. At 516, based on the user ID matching, a document of the corresponding user is printed using the reserved tray.

It is checked whether user ID of the user A matches with the user ID stored/mapped against the tray reservation. If matches, then document received from the user A is printed using the special media sheets loaded by the user A in the tray. Here, it can be considered that user ID of the user A matches with the user ID mapped for the tray reservation. For example, the user ID of the user A matches with the user ID mapped for the tray reservation, a document of the corresponding user, i.e., user A is printed using the one or more special media sheets loaded in the reserved tray. For example, the user ID of the user B does not match with the user ID mapped for the tray reservation, a document of the corresponding user i.e., user B is printed using other available trays. In the given example, the document from the user A is printed using the reserved tray and the document from the user B is not printed using the reserved tray.

Once the document is printed successfully, the reservation of the tray is automatically revoked i.e., the tray is made available for printing documents from all users. In cases where the user A does not submit any document within the pre-defined time, then the reservation of tray is revoked after the pre-defined time is lapsed. This way, the method 500 ensures that the user A who loads the special media, can use the reserved tray for printing his documents on special media sheets loaded in the reserved tray and no other user can mistakenly use special media sheets for printing their documents.

The present disclosure discloses methods and systems to reserve a tray for a user for special media printing. The methods and systems increase the convenience and flexibility for the user to print his documents/content on the special media as other users are not allowed to print their documents/content using the special media sheets in the reserved tray for the user till the pre-defined time and/or the document of the user is printed successfully using the reserved tray. The methods and systems eliminate the incorrect or unintended content being printed on the special media. For example, the methods and systems overcome the problem where other users print their content using special media loaded by someone else. The methods and systems eliminate redundant printing, thereby saving resources such as toner, pages etc. The methods and systems enhance user experience and is very easy to implement.

The present disclosure successfully prints the user's job using the special media sheets without any issue. The methods and systems ensure that once the tray is reserved for the user, no other user can use that reserved tray. As a result, the user does not have to worry about any such scenarios of printing by other users. Also, the methods and systems help avoid any conflict between the users.

The methods and systems allow tray reservation for individual users for their jobs. The methods and systems provide automatic workflow to ensure only intended job gets printed on special media. The methods and systems further provide auto resumption of tray setting upon job completion. At the time of printing, the methods and systems ensure that the multi-function device does not consider or ignore the reserved tray or special media sheets loaded in the reserved tray for printing other user's job.

The present disclosure proposes a simple yet effective way to temporarily dedicate a tray for use by a particular user. The tray is dedicated such that only the corresponding user's job can access the tray.

The methods and systems prevent tray switching scenarios and prevent other jobs from using special media printing, for example, letterhead.

The disclosure may be implemented for media aliases scenarios that can limit media access to a particular user.

Although the disclosure is discussed where tray reservation is implemented for special media printing, but the disclosure can be implemented for other scenarios. For example, the tray reservation can be implemented for regular media printing.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as reserving, mapping, receiving, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for reserving a tray of a multi-function device, the method comprising:
   receiving, by the tray of the multi-function device, one or more media sheets loaded in the tray;
   detecting, by the multi-function device, physical access of the tray for receipt of the one or more media sheets;

in response to the detecting:
identifying, by the multi-function device, a tray ID of the tray,
providing, by the multi-function device, a user interface comprising one or more user-selectable inputs corresponding to media details and to input of a user ID;
performing, by the multi-function device, a mapping between the user ID input at the user interface and the tray ID;
based on the mapping between the input user ID and the tray ID, reserving, by the multi-function device, the tray for printing a document; and
in response to a request, received by the multi-function device, for printing a document from the tray:
printing the document on the one or more media sheets received in the tray in response to determining a user ID associated with the request for printing at the tray matches the user ID input at the user interface, or
disallowing printing the document on the one or more media sheets received in the tray in response to determining the user ID associated with the request for printing at the tray does not match the user ID input at the user interface.

2. The method of claim 1, wherein the media details comprise information relating to a media size.

3. The method of claim 1, wherein the media details comprise at least one of: media type and media color.

4. The method of claim 3, wherein the media type further comprises at least: New Paper Type 3, Custom 7, Transparency, Cardstock, Recycled, Pre-Printed, Heavy Glossy Cardstock, New Paper Type 4, Plain, Letterhead, Heavyweight Cardstock, Bond, Light Glossy Cardstock, Heavy Glossy Card Reloaded, New Paper Type 5, Hole Punched, Lightweight Cardstock, Heavy Cardstock Reloaded, Labels, Glossy Cardstock, and Lightweight.

5. The method of claim 1, wherein the reserving comprises reserving the tray for a pre-defined time or until printing of the document in response to the request for printing.

6. The method of claim 1, further comprising, revoking reservation of the tray in response to the request for printing and determining a user ID associated with the request for printing at the tray matches the user ID input at the user interface not being received by the multi-function device within a pre-defined time.

7. The method of claim 1, further comprising, revoking reservation of the tray in response to the printing of the document in response to the request for printing.

8. The method of claim 1, further comprising, printing the document on one or more other media sheets from another tray of the multi-function device different from the tray in response to determining the user ID associated with the request for printing at the tray does not match the user ID input at the user interface.

9. The method of claim 1, wherein sensing the physical access of the tray comprises sensing closure of the tray.

10. A multi-function device comprising:
a tray configured to receive one or more media sheets for printing;
a controller configured to:
in response to detecting physical access of the tray for receipt of one or more media sheets loaded in the tray:
identify a tray ID of the tray,
provide, by the multi-function device, a user interface comprising one or more user-selectable inputs corresponding to media details and to input of a user ID;
perform a mapping between the user ID input at the user interface and the tray ID,
based on the mapping between the input user ID and the tray ID, reserve the tray for printing a document, and
in response to receiving a request for printing a document from the tray:
cause printing of the document on the one or more media sheets received in the tray in response to determining a user ID associated with the request for printing at the tray matches the user ID input at the user interface, or
disallow printing of the document on the one or more media sheets received in the tray in response to determining the user ID associated with the request for printing at the tray does not match the user ID input at the user interface.

11. The multi-function device of claim 10, wherein the controller is further configured to revoke reservation of the tray in response to the request for printing and the determining a user ID associated with the request for printing at the tray matches the user ID input at the user interface is not received within the pre-defined time.

12. The multi-function device of claim 10, wherein the controller is further configured to revoke reservation of the tray in response to the printing of the document in response to the request for printing.

13. The multi-function device of claim 10, wherein the controller is further configured to cause printing the document on one or more other media sheets from another tray of the multi-function device different from the tray in response to determining the user ID associated with the request for printing does not match the user ID input at the user interface.

14. The multi-function device of claim 10, wherein the controller is configured to sense physical access of the tray by sensing the closure of the tray.

15. A method for reserving a tray of a multi-function device, the method comprising:
receiving, by the multi-function device, one or more media sheets loaded in the tray;
detecting, by the multi-function device, physical access of the tray for receipt of the one or more media sheets;
in response to the detecting:
identifying, by the multi-function device, a tray ID of the tray, and
providing, by the multi-function device, a user interface comprising one or more user-selectable inputs corresponding media details and to input of a user ID;
performing, by the multi-function device, a mapping between the user ID input at the user interface and the tray ID;
based on the mapping between the user ID input at the user interface and the tray ID, reserving for a pre-defined time, by the multi-function device, the tray for subsequent printing in response to a request including the user ID associated with the request matching the user ID input.

16. The method of claim 15, further comprising, in response to a request for printing a document at the tray during the predefined time the tray is reserved and determining a user ID associated with the request does not match with the user ID input at the user interface printing the document corresponding to the request at another tray of the multi-function device different from the tray.

17. The method of claim 15, further comprising, revoking reservation of the tray in response to printing of the document in response to a request including a user ID associated with the request matching the user ID input or lapsing of the pre-defined time.

18. The method of claim 15, sensing the physical access of the tray comprises sensing closure of the tray.

* * * * *